UNITED STATES PATENT OFFICE.

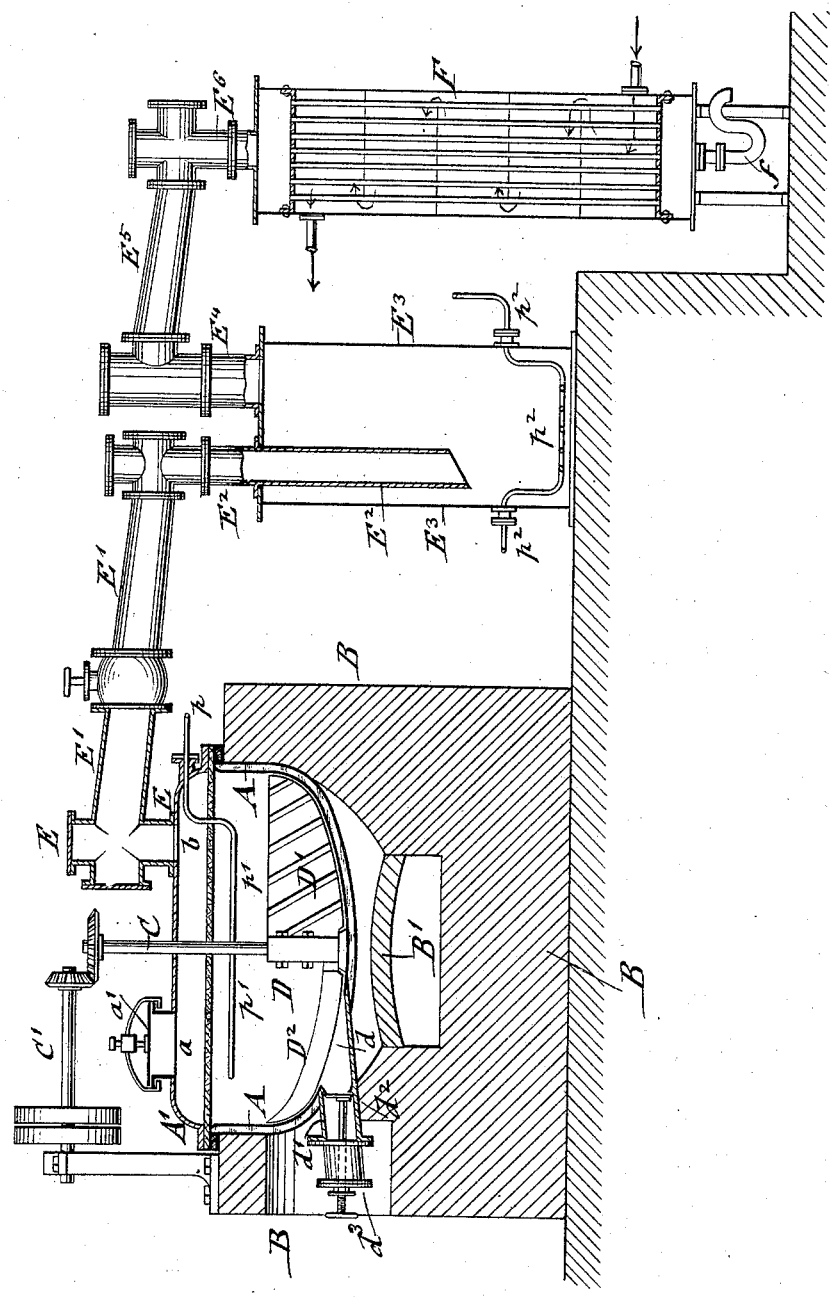

AUGUST BAUSCHLICHER, OF ZBIROW, AUSTRIA-HUNGARY, ASSIGNOR TO THE ROESSLER & HASSLACHER CHEMICAL COMPANY, OF NEW YORK, N. Y.

PROCESS OF AND APPARATUS FOR MAKING ACETONE.

SPECIFICATION forming part of Letters Patent No. 608,019, dated July 26, 1898.

Application filed May 9, 1894. Serial No. 510,598. (No model.)

*To all whom it may concern:*

Be it known that I, AUGUST BAUSCHLICHER, a citizen of the German Empire, residing at Zbirow, in the Kingdom of Bohemia and Empire of Austria-Hungary, have invented certain new and useful Improvements in the Manufacture of Acetone, of which the following is a specification.

The manufacture of acetone was heretofore accomplished either by the destructive distillation of neutral acetate salts, and more especially of acetate of lime, in tubular retorts or in pan-shaped vessels with direct firing and under exclusion of air. By these processes a number of impurities are produced which impair the yield of acetone and affect the purity of the crude acetone.

The object of this invention is to furnish an improved process by which the formation of secondary decomposition products is to a considerable extent obviated, a better quality of crude acetone, and a higher yield of pure acetone are obtained.

The invention consists of a process of making acetone which consists in mixing an acetate, and more especially acetate of lime mixed with milk of lime, and subjecting the mixture in a perfectly dry state under continuous stirring to a constant heat of superheated steam, then condensing the acetone vapors into crude acetone, mixing the crude acetone with water, so as to separate the acetone oils, and finally rectifying the crude acetone after separation from its impurities.

The invention consists, further, of the process of utilizing the resulting secondary products, such as the acetone oils, by mixing them with water under pressure and subjecting the mixture to distillation, so as to obtain pure acetone from the same.

The invention consists, further, of the apparatus for carrying out my improved process which comprises a mixing vessel, a collecting vessel for separating the fine particles of the acetate, which are carried along by the acetone vapors, steam-supply pipes for the mixing and collecting vessel, a condenser, and tubes connecting the mixing vessel, collecting vessel, and condenser, as will be fully described hereinafter and finally pointed out in the claims.

The accompanying drawing shows a vertical longitudinal section of my improved apparatus, which is used in carrying out my improved process of producing acetone.

The apparatus consists of a closed mixing vessel A, which is formed of an exterior and an interior pan-shaped vessel, the space or jacket between which is filled with molten lead that is retained in the molten condition by the heat of a furnace below the mixing vessel. The lead-bath which is thus obtained keeps up a constant temperature of 300° centigrade in the mixing vessel A. A furnace B is built up of bricks and extended around the mixing vessel A. An arched grate B' is arranged over the furnace, so as to prevent the direct contact of the flames with the bottom of the mixing vessel A and secure the uniform distribution of the fire-gases around the lead-bath of the mixing vessel A. This arrangement produces at the same time a considerable saving in fuel. The mixing vessel A can be heated either with solid, liquid, or gaseous fuel, as desired. On the interior of the vessel is arranged an agitator D, the vertical shaft C of which is supported in a step-bearing at the bottom of the interior pan and in a neck-bearing of the cover A'. A manhole $a$ is arranged in the cover A' and closed by a manhole-cover $a'$, while a discharge-opening $d$ is arranged in the bottom of the interior pan and connected by a tubular discharge-spout $d'$, that passes through the lower parts of the interior and exterior pans into an opening in the brick wall of the furnace, the discharge-spout $d'$ being provided with an interior adjustable gate $d^2$ and with an exterior detachable cover $d^3$, so as to permit thereby the ready discharging of the contents of the mixing vessel A when the operation of distilling off the crude acetone from the charge is completed. A second opening $b$ in the cover A' is connected with a vertical tube E, which communicates by a horizontal tube E' with a downwardly-extending tube $E^2$, which latter passes in downward direction into an intermediate collecting vessel $E^3$. The collecting vessel $E^3$ is again connected by tubes $E^4$ $E^5$ $E^6$ with a condenser F, which latter is supplied with cold water that is admitted at the lower part of the condenser and conducted off at the upper part of the same, so that the acetone vapors are passed in a countercurrent to the cooling-water through the tubes of the condenser.

The shaft C of the agitator D receives rotary motion by bevel-gears from a horizontal shaft C', which is provided in the usual manner with a fast and loose pulley. The agitator D is formed of a radial plate D', having downwardly-inclined grooves, and a scraper $D^2$ diametrically opposite thereto, so that a mixing and scraping action is exerted on the contents of the vessel and the settling of the same on the bottom of the interior pan prevented. A steam-supply pipe $p$ extends through the cover A' into the interior of the mixing vessel A, said supply-pipe being connected with a superheater, (not shown in the drawings,) which is preferably heated by the products of combustion of the furnace B. The steam-supply pipe $p$ is bent at the interior of the mixing vessel A into a perforated coil $p'$, so that the superheated steam is supplied uniformly to the interior of the vessel A, assisting not only in the rapid escape of the acetone vapors, but in the prevention of secondary decomposition and condensation products. The acetone vapors pass from the mixing vessel through the connecting-tubes E E' $E^2$ into the collecting vessel $E^3$, which is likewise provided at its bottom with a perforated coil $p^2$, through which superheated steam is supplied. From the collecting vessel $E^3$ the acetone vapors pass by the connecting-tubes $E^4$ $E^5$ $E^6$ into the condenser F, in which they are condensed into crude acetone. The collecting vessel retains the dry fine particles of lime which are carried over by the acetone vapors and prevents thereby the choking up of the connecting-tubes. The liquid acetone is discharged through a gooseneck-pipe $f$ at the lower part of the condenser into a suitable receptacle. This crude acetone is then mixed with several times its quantity of water in a closed vessel of sufficient size and permitted to stand for about twenty-four hours. All insoluble impurities and tar-oils are collected on the surface of the water and are separately drawn off. The crude acetone forms, with the water, a clear solution, which is next subjected to distillation in a column rectifier. The distillate obtained is chemically pure acetone containing 99.5 per cent. of acetone which distils between 56° and 58° centigrade.

The impurities which are obtained by the destructive distillation of the acetate and during the initial and final runs of the rectification process are insoluble in water and could not heretofore be properly utilized. By the following process, however, these by-products or acetone oils can be utilized and converted into acetone, which is well adapted for various applications in the arts. While it is not possible to convert the acetone oils by direct distillation, my improved process admits the production of from fifty to seventy per cent. of acetone from the same. For this purpose the acetone oils are mixed with an equal quantity of water and permitted to stand for several days while subjected to pressure and occasional stirring. For some of the oils a slight acidulation is preferable. The entire mixture is then distilled with steam in a suitable rectifying apparatus. The distillate consists in its greater part of acetone in its smaller parts of condensation products. In place of permitting the acetone oils to stand with water for a few days they can also be mixed directly with water by means of an injector, which is operated by steam or compressed air, and forced with water into the body of a distilling and rectifying apparatus. During the injection of the oils into the water the connection of the rectifier with the condenser is closed; but as soon as a maximum pressure is obtained the injection of oils is interrupted, the communication with the condenser opened, and the distilling process started with the result obtained before described.

In charging the mixing vessel A the acetate of lime is intimately mixed with five per cent. of hydrate of lime in the form of milk of lime and then dried. The mixture is transferred while in hot state into the mixing vessel, the addition of lime preventing the loss of acetic-acid hydrate and the consequent loss of acetone, as the free acetic acid, which is produced by the dry distillation of the neutral acetate of lime, is immediately *in statu nascendi* united with the lime. As the charge is subjected to a constant heat, owing to the lead-bath, any chance of decomposition is prevented. The charge of acetate of lime and milk of lime is introduced through the manhole in the cover, which is quickly closed after charging, as the generation of acetone commences immediately. The agitator is then set in motion, so that the acetate of lime is subjected to heat under the generation of vapors. Superheated steam is supplied to the mixing vessel during the entire operation, the process of steam facilitating the escape of the vapors and preventing the formation of decomposition products. The acetone vapors pass through the collecting vessel into the condenser, while the fine particles of carbonate of lime which are carried along by the vapors are deposited in the collecting vessel and separated thereby from the vapors. When the operation is completed, the contents of the mixing vessel are discharged through the discharge-pipe, the scraper and radial plate of the agitator assisting in moving the entire body of carbonate of lime from the mixing vessel into the discharge-spout and from the same to the outside. The mixing vessel is then again charged immediately with a new mixture of dry acetate of lime and calcium hydrate, as before described, and the process repeated, and so on.

Having thus described my invention, I claim as new and desire to secure by Letters Patent—

1. The process herein described of producing acetone, which consists in subjecting a dry mixture of acetate of lime and calcium hydrate under continuous stirring at a constant temperature to the action of superheated steam so as to separate the acetone vapors; condensing the acetone vapors into crude liquid acetone; and lastly, rectifying the crude acetone, substantially as set forth.

2. The process herein described of producing acetone, which consists of the following steps: first, mixing acetate of lime with calcium hydrate; second, subjecting the dry mixture under continuous stirring to a constant temperature to the action of superheated steam, so as to separate the acetone vapors from the remaining carbonate of lime; third, condensing the acetone vapors into crude liquid acetone; fourth, mixing crude acetone with water in excess, and permitting it to stand so as to separate the tar-oils and other impurities, and lastly, rectifying the so-crude-washed acetone so as to obtain pure acetone, substantially as set forth.

3. In the manufacture of acetone, the process of utilizing the resulting secondary products or acetone oils obtained by the destructive distillation of the acetate and during the rectifying process by mixing them with water under pressure and subjecting the mixture to rectification, so as to obtain pure acetone from the same, substantially as set forth.

4. The apparatus herein described for producing acetone, which consists in a closed mixing vessel provided with a lead-bath, an agitator in said mixing vessel, a collecting vessel, tubes connecting the mixing vessel with said collecting vessel, a condenser, tubes for connecting said condenser with the collecting vessel, steam-supply pipes and coils in the mixing and collecting vessels for supplying superheated steam to the same, substantially as set forth.

In testimony that I claim the foregoing as my invention I have signed my name in presence of two subscribing witnesses.

AUGUST BAUSCHLICHER.

Witnesses:
 FRANZ WALENTANY,
 ROLOF TEIRGENSEN.